USO10697362B2

(12) United States Patent
Smiljanovski et al.

(10) Patent No.: US 10,697,362 B2
(45) Date of Patent: Jun. 30, 2020

(54) SYSTEMS AND METHODS FOR A BOOSTED INTERNAL COMBUSTION ENGINE WITH AN INTAKE-SIDE BYPASS LINE

(71) Applicant: Ford Global Technologies, LLC, Dearborn, MI (US)

(72) Inventors: Vanco Smiljanovski, Bedburg (DE); Frank Kraemer, Neunkirchen-Seelscheid (DE); Joerg Kemmerling, Monschau (DE); Helmut Kindl, Aachen (DE); Franz Arnd Sommerhoff, Aachen (DE); Andreas Kuske, Geulle (NL); Jens Groeger, Glashuette (DE); Hanno Friederichs, Aachen (DE); Franz Brinkmann, Huerth-Efferen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 124 days.

(21) Appl. No.: 15/983,586

(22) Filed: May 18, 2018

(65) Prior Publication Data
US 2018/0355790 A1 Dec. 13, 2018

(30) Foreign Application Priority Data
Jun. 9, 2017 (DE) .......................... 10 2017 209 789

(51) Int. Cl.
*F02B 37/22* (2006.01)
*F02B 21/00* (2006.01)
(Continued)

(52) U.S. Cl.
CPC ............ *F02B 37/225* (2013.01); *F02B 21/00* (2013.01); *F02B 29/02* (2013.01); *F02B 33/40* (2013.01);
(Continued)

(58) Field of Classification Search
CPC .. F02B 37/225; F02B 37/24; F02B 2037/122; F02B 2037/125; F02B 37/12; F02M 35/10157; F02M 35/10255
(Continued)

(56) References Cited

U.S. PATENT DOCUMENTS 3,020,901 A * 2/1962 Cook ...................... F02B 33/00
123/559.1
3,462,071 A 8/1969 Garve
(Continued)

FOREIGN PATENT DOCUMENTS

DE  202016100736 U1  4/2016
FR      1364249 A  *  6/1964  ............ F02B 33/446
JP     59096433 A  *  6/1984  .............. F02B 37/12

*Primary Examiner* — Thai Ba Trieu
(74) *Attorney, Agent, or Firm* — Geoffrey Brumbaugh; McCoy Russell LLP

(57) ABSTRACT

Methods and systems are provided for a boosted internal combustion engine. In one example, a system may include an intake system for supplying charge air, a compressor arranged in the intake system, a first shut-off element arranged in the intake system upstream of an impeller of the compressor, a bypass line that branches off from the intake system upstream of the first shut-off element and that rejoins the intake system upstream of the impeller, a second shut-off element arranged in the bypass line, a compressed air line that opens into the bypass line downstream of the second shut-off element, and a third shut-off element arranged in the compressed air line. A map width of the compressor may be increased by providing airflow to the impeller via the bypass line during low mass flow conditions, and impeller acceleration may be expedited by providing compressed air via the compressed air line.

14 Claims, 6 Drawing Sheets

(51) Int. Cl.
| | |
|---|---|
| *F02B 29/02* | (2006.01) |
| *F02B 33/40* | (2006.01) |
| *F02B 37/24* | (2006.01) |
| *F02D 9/10* | (2006.01) |
| *F02D 23/00* | (2006.01) |
| *F02D 31/00* | (2006.01) |
| *F02D 41/00* | (2006.01) |
| *F02M 35/10* | (2006.01) |
| *F02M 23/00* | (2006.01) |
| *F02B 37/12* | (2006.01) |

(52) U.S. Cl.
   CPC ............ *F02B 37/24* (2013.01); *F02D 9/1055* (2013.01); *F02D 23/00* (2013.01); *F02D 31/005* (2013.01); *F02D 41/0007* (2013.01); *F02M 23/00* (2013.01); *F02M 35/10157* (2013.01); *F02M 35/10255* (2013.01); *F02M 35/10262* (2013.01); *F02B 2037/125* (2013.01); *Y02T 10/144* (2013.01); *Y02T 10/146* (2013.01)

(58) Field of Classification Search
   USPC .................................................. 60/605.1, 611
   See application file for complete search history.

(56) References Cited

U.S. PATENT DOCUMENTS

| | | | |
|---|---|---|---|
| 4,689,960 | A | 9/1987 | Schroder et al. |
| 4,696,165 | A * | 9/1987 | Bucher ................... F02B 37/04 60/611 |
| 7,685,819 | B2 * | 3/2010 | Vetrovec ................ F02B 37/24 60/611 |
| 7,698,894 | B2 * | 4/2010 | Wood ..................... F02B 37/22 60/605.1 |
| 8,161,745 | B2 * | 4/2012 | Dorle ..................... F02B 37/16 60/605.1 |
| 2015/0139777 | A1 * | 5/2015 | Almkvist ............. F02D 41/0007 415/1 |
| 2016/0017792 | A1 * | 1/2016 | Fletcher ................. F02B 37/16 137/526 |
| 2017/0307098 | A1 * | 10/2017 | Fletcher ........... F02M 35/10157 |
| 2017/0335805 | A1 * | 11/2017 | Zhang ................ F02D 41/0077 |

* cited by examiner

SYSTEMS AND METHODS FOR A BOOSTED INTERNAL COMBUSTION ENGINE WITH AN INTAKE-SIDE BYPASS LINE

CROSS REFERENCE TO RELATED APPLICATION

The present application claims priority to German Patent Application No. 102017209789.2, filed Jun. 9, 2017. The entire contents of the above-referenced application are hereby incorporated by reference in its entirety for all purposes.

FIELD

The present description relates generally to systems and methods for a forced induction internal combustion engine.

BACKGROUND/SUMMARY

Vehicle engine systems may be configured with boosting devices, such as turbochargers or superchargers, for providing a boosted air charge and increasing peak power outputs. Turbochargers include a turbine in an exhaust path of the engine that harnesses some of the available exhaust energy to drive a compressor. The hot exhaust gas flow is fed to the turbine and expands in the turbine with a release of energy, rotating a shaft coupled to the compressor. If the boosting device is a supercharger, instead of being driven by the exhaust turbine, the compressor may be driven directly or indirectly by the engine, such as via a mechanical or kinematic connection (e.g., a belt, chain, or gear), or by an electric motor (in the case of an electric supercharger). The compressor, coupled to an intake system of the engine, conveys and compresses intake air, increasing charging of cylinders of the engine. The use of a compressor allows a smaller displacement engine to provide as much power as a larger displacement engine but with additional fuel economy benefits.

An advantage of a turbocharger over a supercharger is that the turbocharger utilizes the exhaust gas energy, whereas the supercharger places a mechanical load on the engine, thereby reducing its efficiency. However, a supercharger can generate, and make available, a desired charge pressure at all times, regardless of the operating state of the engine, particularly when the supercharger is electrically driven. In contrast, difficulties are encountered in achieving an increase in power in all engine speed ranges by turbocharging. For example, a relatively severe torque drop is observed when an engine speed is undershot. That is, if the engine speed is reduced, there is a smaller exhaust gas mass flow and, therefore, a lower turbine pressure ratio. Consequently, toward lower engine speeds, a charge pressure ratio likewise decreases. This equates to a torque drop.

For example, in the presence of low charge air flow rates, a flow velocity of the charge air in the intake system falls to such an extent that the flow approaching an impeller of the compressor is impaired. As a result, a pressure increase resulting from the charge air flowing through the compressor can be realized only to a limited extent, or not at all. Rather, the charge air flow separates from the impeller blades, a partial backward flow occurs, and the compressor begins to surge. Furthermore, in transient operation of the engine, such as during a tip-in, the turbocharger may not be able to quickly meet an increased load demand from a vehicle operator. A higher charge pressure requires an acceleration of the compressor to higher rotational speeds, which is delayed as the turbine spins up.

Other attempts to increase low end torque of a turbocharged engine include shifting a surge limit of the compressor toward smaller compressor flows in order to provide charge pressures high enough to realize a satisfactory torque characteristic of the internal combustion engine even at low engine speeds and low charge air flow rates. One example approach includes staging multiple turbochargers arranged in parallel, with each turbocharger including a turbine having a relatively small turbine cross section so that the turbines are activated successively with increasing exhaust gas flow rate. In this way, a surge limit of the turbocharger compressor is shifted toward smaller charge air flows, such that, in the presence of low charge air flow rates, adequately high charge pressures can be provided in order to ensure a satisfactory torque characteristic of the engine at low engine speeds. Furthermore, the smaller turbines and the corresponding compressors can be accelerated more quickly. As another example, a plurality of turbochargers may be connected in series. By connecting two turbochargers in series, of which one turbocharger serves as a high-pressure stage and one turbocharger serves as a low-pressure stage, a compressor characteristic map can be expanded, both in the direction of smaller compressor flows and also in the direction of larger compressor flows.

Further attempts to increase a performance of a turbocharger compressor at slow or idle engine speeds and reduce response time during transient conditions include providing an auxiliary source of propellant gas or driving fluid to the compressor. One example approach is shown by Garve et al. in U.S. Pat. No. 3,462,071 A. Therein, an auxiliary propellant fluid is supplied directly to an outer portion of impeller blades of a radial compressor via a plurality of nozzles, with the amount of fluid varied based on operating conditions.

However, the inventors herein have recognized potential issues with such systems. As one example, staging multiple turbochargers in parallel or in series may increase vehicle costs and complexity. As another example, the system of U.S. Pat. No. 3,462,071 A may not be adaptable to axial compressors. Furthermore, the inventors herein have recognized that intake air may be utilized as a propellant gas without need of an auxiliary source during low engine speed conditions.

In one example, the issues described above may be addressed by a system for an internal combustion engine, comprising: an intake system for supplying charge air; a compressor arranged in the intake system, the compressor including an impeller arranged on a rotatable shaft in a compressor housing; a first shut-off element arranged in the intake system upstream of the impeller; a bypass line that branches off from the intake system upstream of the first shut-off element and opens into the intake system again between the first shut-off element and the impeller, forming a mouth region, and in which a second shut-off element is provided; a compressed air line that opens into the bypass line between the mouth region and the second shut-off element, the compressed air line coupled to a vessel that stores compressed air; and a third shut-off element arranged in the compressed air line. In this way, intake air may be provided to the impeller during smaller compressor flow conditions at an increased velocity via the bypass line.

As one example, the bypass line may form an acute angle of inclination $\alpha$ with respect to the shaft in the mouth region. Furthermore, in some examples, an adjustable guide device may be positioned at the mouth region to adjust the angle of inclination $\alpha$. The mouth region may have a slot-like or nozzle-like form so that a velocity of the charge air is increased by flowing through the mouth region. Furthermore, the mouth region may cause an impingement of charge air on a limited segment of the impeller so that only a sub-region of the impeller interacts with the charge air. By adjusting the first shut-off element to a closed position and the second shut-off element to an open position, charge air may be supplied to the impeller via the bypass line and not directly via the intake system. Further still, the compressed air line may supply compressed air to quickly accelerate the impeller under transient conditions, such as during an abrupt increase in engine load demand (e.g., a tip-in event), by adjusting the third shut-off element to an open position. In this way, a compact and simple system is provided for efficiently adjusting charge air flow through the compressor. As a result, a map width of the compressor is increased, such as by extending a surge margin at low flow rates by providing charge air via the bypass passage. Additionally, turbo-lag is reduced by accelerating the impeller via the compressed air line. Overall, high low end engine torque and fast transient responses may be provided.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
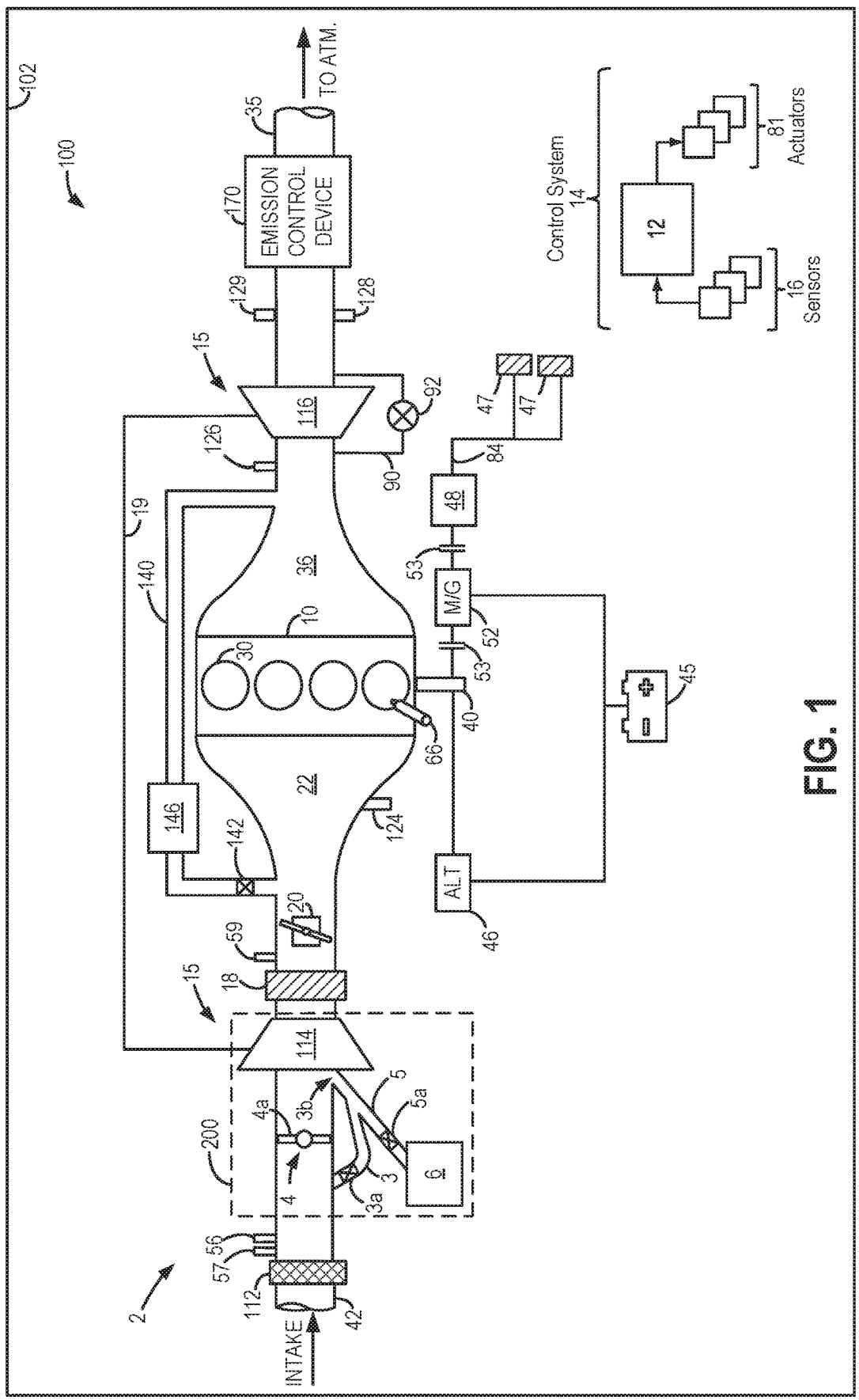
FIG. 1 shows a schematic depiction of an example vehicle system.
Figure 4:
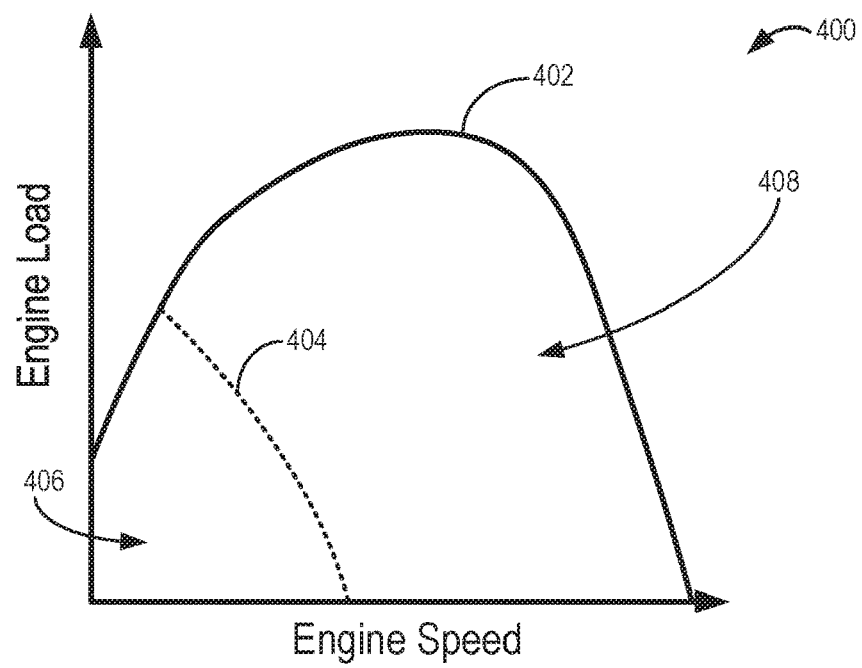
FIG. 4 is an example engine map, which may be referenced for adjusting operation of the compressor surge line system.
Figure 5:
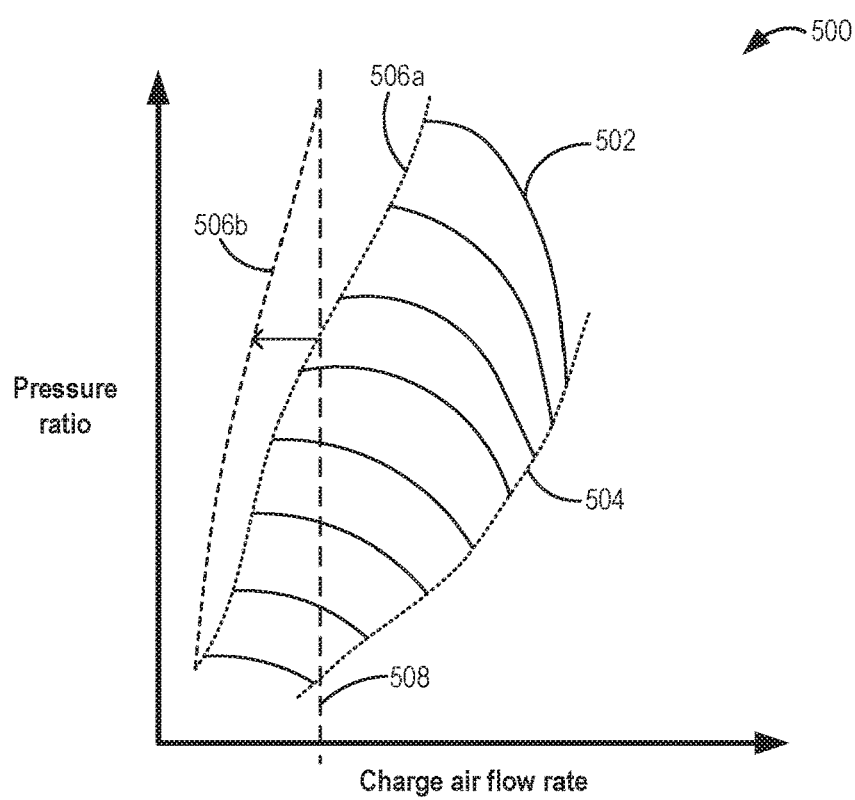
FIG. 5 is an example compressor map, which may be referenced for adjusting operation of the compressor surge line system.
Figure 6:
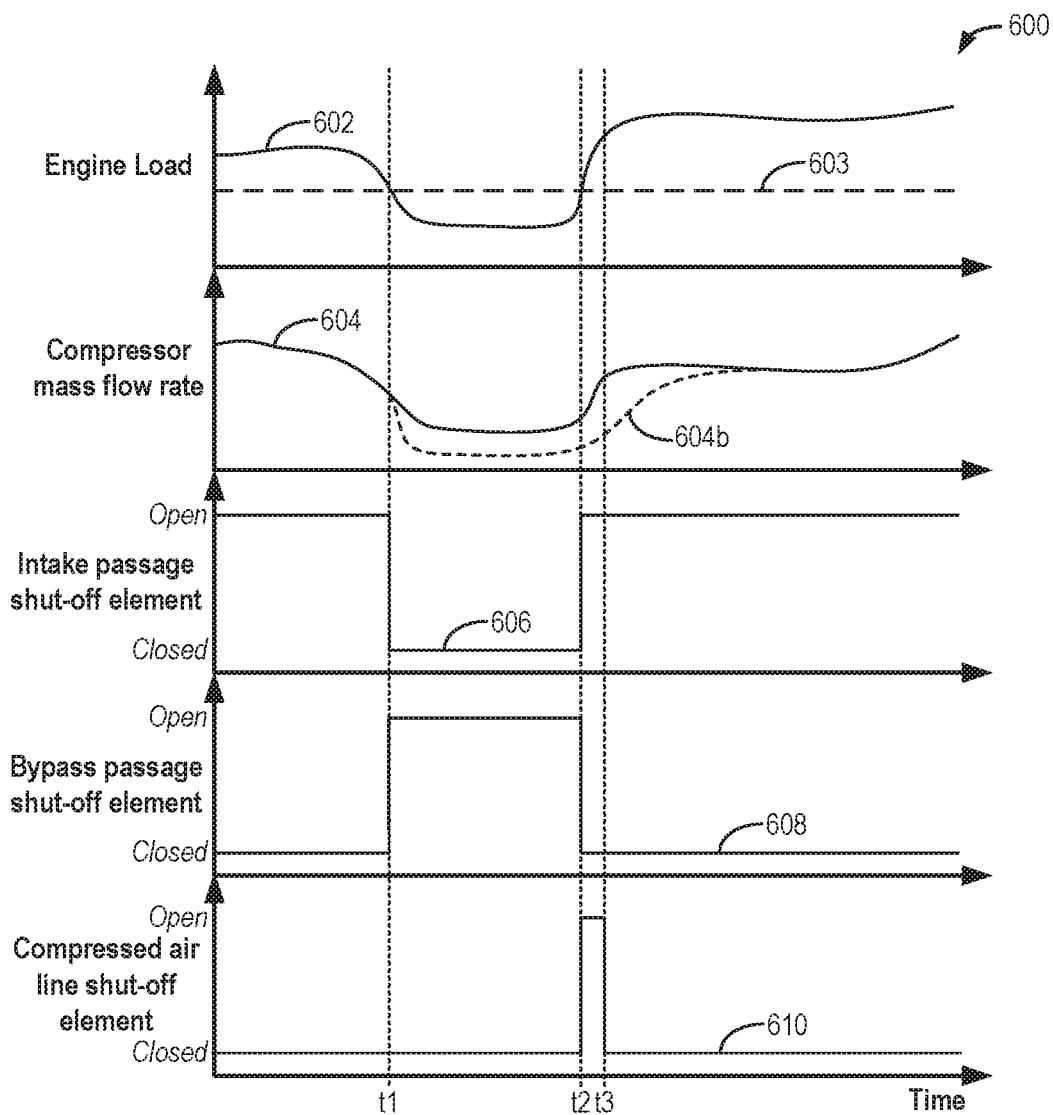
FIG. 6 is a prophetic example timeline for adjusting the surge line system based on engine operating conditions.

The following description relates to systems and methods for a boosted engine that may be included in a vehicle, such as the example vehicle system shown in FIG. 1. A compressor in the intake system of the engine may include a surge line system for increasing a surge margin of the compressor at lower engine speeds and loads, the surge line system including a bypass line at the intake-side of the compressor and a plurality of shut-off elements, as illustrated with respect to FIGS. 2A-2C. The plurality of shut-off elements may be adjusted based on operating conditions in order to provide boosted charge air to the engine at high compressor efficiencies, such as according to the method of FIG. 3. The plurality of shut-off elements may be adjusted based on engine operating conditions, such as by referencing an engine map. An example engine map is illustrated in FIG. 4. Additionally or alternatively, the plurality of shut-off elements may be adjusted based on compressor operating conditions, such as by referencing a compressor map. An example compressor map is illustrated in FIG. 5. FIG. 6 shows an example timeline of adjusting the plurality of shut-off elements based on engine load in order to increase a mass flow of the compressor at low engine loads, thereby providing high low end torque, and decrease a response time of the compressor during transient conditions.

FIG. 1 schematically shows aspects of an example engine system 100, including an engine 10 coupled in a vehicle 102. In some examples, vehicle 102 may be a hybrid vehicle with multiple sources of torque available to one or more vehicle wheels 47. In other examples, vehicle 102 is a conventional vehicle with only an engine. In the example shown, a powertrain of vehicle 102 includes engine 10 and an electric machine 52. Electric machine 52 may be a motor or a motor/generator. Engine 10 and electric machine 52 are connected to vehicle wheels 47 via a transmission 48 when one or more clutches 53 are engaged. In the depicted example, a (first) clutch 53 is provided between engine 10 and electric machine 52, and a (second) clutch 53 is provided between electric machine 52 and transmission 48. A controller 12 may send a signal to an actuator of each clutch 53 to engage or disengage the clutch, thereby connecting or disconnecting engine 10 from electric machine 52 and the components connected thereto and/or connecting or disconnecting electric machine 52 from transmission 48 and the components connected thereto. For example, torque from engine 10 may be transferred to vehicle wheels 47 via a crankshaft 40, transmission 48, and a powertrain shaft 84 when clutches 53 are engaged. Transmission 48 may be a gearbox, a planetary gear system, or another type of transmission. Transmission 48 may be a fixed ratio transmission that includes a plurality of gear ratios to allow engine 10 to rotate at a different speed than wheels 47. By changing a torque transfer capacity of first clutch 53 (e.g., an amount of clutch slippage), an amount of engine torque relayed to the wheels via powertrain shaft 84 may be modulated.

The powertrain may be configured in various manners, including as a parallel, a series, or a series-parallel hybrid vehicle. In electric vehicle embodiments, a system battery 45 may be a traction battery that delivers electrical power to electric machine 52 to provide torque to vehicle wheels 47. In some embodiments, electric machine 52 may also be operated as a generator to provide electrical power to charge system battery 45, for example, during a braking operation. It will be appreciated that in other embodiments, including non-electric vehicle embodiments, system battery 45 may be a typical starting, lighting, ignition (SLI) battery coupled to an alternator 46. Alternator 46 may be configured to charge system battery 45 using engine torque drawn from the crankshaft during engine running. In addition, alternator 46 may power one or more electrical systems of the engine, such as one or more auxiliary systems including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based upon system usage requirements, including auxiliary system demands.

In the depicted example, engine 10 is a boosted engine configured with a boosting device. Specifically, engine 10 includes a turbocharger 15 having a compressor 114 coupled to an intake passage 42. Compressor 114 is shown mechanically coupled to a turbine 116 via a shaft 19, the turbine 116 coupled to an exhaust passage 35 and driven by expanding engine exhaust. In one example, the turbocharger may be a twin scroll device. In another example, the turbocharger may include a variable geometry turbine (VGT), wherein turbine geometry is actively varied as a function of engine operating conditions. However, other combinations and configurations of boosting devices may be possible without departing from the scope of this disclosure. For example, in alternative examples, turbocharger 15 may be an electric turbocharger having an electric motor coupled to the compressor, turbine, or turbocharger shaft, or may be an electrical or mechanical supercharger. In still other examples, a plurality of boosting devices may be present, such as two turbochargers staged in series, two turbochargers staged in parallel, or any combination of turbochargers and superchargers. Furthermore, in some examples, compressor 114 may be a radial compressor. In other examples, compressor 114 may be an axial compressor.

Fresh air is introduced into an intake system 2 along intake passage 42 via an air box 112 and flows to compressor 114. Compressor 114 is included in a compressor surge line system 200 within intake system 2. Compressor surge line system 200 includes a shut-off element 4 arranged in intake passage 42 upstream of compressor 114. In one example, as shown, shut-off element 4 includes a pivotable flap 4a (e.g., a butterfly valve). Pivotable flap 4a may be transitioned between a fully closed and a fully open position based on operating conditions, as further described with respect to FIGS. 2A-2C. A bypass line 3 is provided that branches off from intake passage 42 upstream of pivotable flap 4a and opens into intake passage 42 again at a mouth region 3b between pivotable flap 4a and compressor 114. For example, bypass line 3 is coupled to intake passage 42 at a first junction that is upstream of shut-off element 4 and at a second junction that is downstream of shut-off element 4. Bypass line 3 includes a shut-off element 3a for opening and shutting off bypass line 3. For example, in the presence of low charge air flow rates, pivotable flap 4a is moved into the closed position, shut-off element 3a is opened, and compressor 114 is supplied with charge air via bypass line 3, as will be elaborated below at FIG. 2A.

Compressor surge line system 200 further includes a compressed air line 5 that opens into bypass line 3 between mouth region 3b of bypass line 3 and shut-off element 3a. Compressed air line 5 is connected to a compressed air vessel 6. A line-specific shut-off element 5a is arranged in compressed air line 5, wherein, by opening shut-off element 5a, the compressed air line 5 is opened, and additional air may be introduced into intake system 2 via compressed air vessel 6. The additional air introduced via compressed air line 5 serves to accelerate compressor 114, as also elaborated below. For example, the line-specific shut-off element 5a arranged in the compressed air line 5 may be briefly opened in order to accelerate an impeller of the compressor in the event of an abrupt increase of the load demand.

Compressor 114 is coupled to a throttle 20 through a charge air cooler (CAC) 18 (also referred to as an intercooler). Air flows from compressor 114 through CAC 18 and throttle 20 to an intake manifold 22. CAC 18 may be an air-to-air or water-to-air heat exchanger, for example. Intake manifold pressure (e.g., a pressure of the air charge within the intake manifold) may be determined using a manifold absolute pressure (MAP) sensor 124.

In particular, a position of throttle 20 may be adjusted to adjust the engine load in wide ranges, in particular in the presence of very low charge air flow rates, or in order to be able to shut off the supply of air to combustion chambers (or cylinders) 30 of engine 10. For example, the throttle 20 may comprise a throttle flap. Furthermore, the temperature of the charge air is reduced by way of cooling via CAC 18, and the density may be increased. In this way, CAC 18 contributes to increased charging of the cylinders.

Intake manifold 22 is coupled to a series of combustion chambers 30 through a series of intake valves (not shown). The combustion chambers are further coupled to an exhaust manifold 36 of an exhaust system via a series of exhaust valves (not shown). In the depicted example, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one example, each of the exhaust and intake valves may be electronically actuated or controlled. In another example, each of the exhaust and intake valves may be cam actuated or controlled. Whether electronically actuated or cam actuated, the timing of exhaust and intake valve opening and closure may be adjusted for a desired combustion and emissions control performance. For example, the cam timing may be adjusted via a variable cam timing system to move the intake and exhaust cams to a position that provides an optimal volumetric efficiency for the given operating conditions.

Combustion chambers 30 may be supplied one or more fuels, such as gasoline, alcohol fuel blends, diesel, biodiesel, compressed natural gas, etc. Fuel may be supplied to the combustion chambers via direct injection, port injection, throttle valve-body injection, or any combination thereof. In the depicted example, fuel is provided to each combustion chamber 30 via direct injection by a fuel injector 66 (while only one fuel injector is shown in FIG. 1, each combustion chamber includes a fuel injector coupled thereto). Fuel may be delivered to fuel injector 66 by a fuel system (not shown) including a fuel tank, a fuel pump, and a fuel rail. In the combustion chambers, combustion may be initiated via spark ignition and/or compression ignition.

As shown in FIG. 1, exhaust from exhaust manifold 36 is directed to turbine 116 to drive the turbine. When reduced turbine torque is desired, a portion of exhaust may be directed instead through a turbine bypass passage 90, bypassing the turbine. A wastegate actuator 92 (e.g., a wastegate valve) may be actuated open to relieve at least some exhaust pressure from upstream of turbine 116 to a location downstream of turbine 116 via turbine bypass passage 90. By reducing exhaust pressure upstream of turbine 116, turbine speed may be reduced.

The combined flow from turbine 116 and wastegate 90 flows through an emission control device 170. In general, emission control device 170 may include one or more exhaust after-treatment components configured to reduce an amount of one or more substances in the exhaust flow. For example, one exhaust after-treatment component may be configured to trap $NO_x$ from the exhaust flow when the exhaust flow is lean and to reduce the trapped $NO_x$ when the exhaust flow is rich. In other examples, an exhaust after-treatment component may be configured to disproportionate $NO_x$ or to selectively reduce $NO_x$ with the aid of a reducing agent. In still other examples, emission control device 170 includes a three-way catalyst configured to oxidize residual hydrocarbons and carbon monoxide while reducing $NO_x$ in the exhaust flow. Different exhaust after-treatment catalysts having any such functionality may be arranged in wash coats or elsewhere in emission control device 170, either separately or together. In some examples, emission control device 170 may further include a regeneratable soot filter configured to trap and oxidize soot particles in the exhaust flow.

All or part of the treated exhaust from emission control device 170 may be released into the atmosphere via exhaust passage 35. Depending on operating conditions, however, some exhaust may be diverted instead to intake passage 42 via an exhaust gas recirculation (EGR) system, including an EGR passage 140. The EGR system is shown as a high-pressure (HP) EGR system, although in other examples, a low-pressure (LP) EGR system may additionally or alternatively be included. Exhaust gas is routed through EGR passage 140 from upstream of turbine 116 to downstream of compressor 114. The amount EGR provided to intake passage 42 downstream of compressor 114 may be varied by controller 12 via EGR valve 142. The EGR system may further include an EGR cooler 146 to reject heat from the EGR gases to engine coolant, for example.

Under some conditions, the EGR system may be used to regulate the temperature of the air and fuel mixture within combustion chamber 30. Thus, it may be desirable to measure or estimate the EGR mass flow. EGR sensors may be arranged within EGR passage 140 and may provide an indication of one or more of mass flow, pressure, and temperature of the exhaust gas, for example.

One or more sensors may be coupled to intake passage 42 upstream of compressor 114 for determining a composition and condition of charge air entering the compressor. For example, a pressure sensor 56 may be coupled to intake passage 42 upstream of compressor 114 for estimating a pressure of air entering the compressor. Still other sensors may include, for example, air-fuel ratio sensors, humidity sensors, etc. The sensors may estimate a condition of the intake air received at the compressor inlet from the intake passage. In addition, a throttle inlet pressure (TIP) sensor 59 may be coupled downstream of CAC 18 and upstream of throttle 20 for estimating a boost pressure delivered to the engine.

During an operator tip-in event, or when going from engine operation without boost to engine operation with boost responsive to an increase in operator torque demand, turbo lag can occur. This is due to delays in turbine 116 spin-up due to the turbocharger being a slower-acting compression device, and a momentary reduction in flow through compressor 114 when throttle valve 20 opens at the tip-in. The same may also occur when the engine is operating boosted and there is a transient increase in boost demand due to an increase in accelerator pedal application by the vehicle operator. Specifically, responsive to the tip-in, wastegate actuator 92 may be closed (e.g., fully closed) to increase exhaust flow through turbine 116. While turbine 116 spins-up, additional air flow can be transiently provided via compressed air vessel 6, such as by fully opening shut-off element 5a within compressed air line 5. The additional air, which is directed onto an impeller of the compressor as an air jet, has a high level of kinetic energy, introducing a high angular momentum into the impeller to accelerate compressor 114 and increase an amount of boost provided by turbocharger 15. When the turbine has sufficiently spun up and the turbocharger is capable of providing the requested amount of boost, shut-off element 5a may be fully closed so that additional air is no longer provided by compressed air vessel 6.

During an operator tip-out event, when going from engine operation with boost to engine operation without boost (or reduced boost), compressor surge may occur. This is due to a decreased flow through compressor 114 when throttle 20 closes at the tip-out. The reduced forward flow through compressor 114 can cause surge and degrade turbocharger performance. In addition, surge can lead to noise, vibration, and harshness (NVH) issues, such as undesirable noise from intake system 2. Closing shut-off element 4 and opening shut-off element 3a to route intake air through bypass line 3 may enable the torque demand to be rapidly reduced responsive to the tip-out without incurring compressor surge, as elaborated below with respect to FIG. 2A. In addition, wastegate actuator 92 may be moved to a more open (e.g., fully open) position so that more of the exhaust flow travels to the tailpipe while bypassing the turbine, thereby expediting turbine spin-down.

Controller 12 may be included in a control system 14. Controller 12 is shown receiving information from a plurality of sensors 16 (various examples of which are described herein) and sending control signals to a plurality of actuators 81 (various examples of which are described herein). As one example, sensors 16 may include an exhaust gas sensor 126 located upstream of turbine 116, MAP sensor 124, an exhaust temperature sensor 128, an exhaust pressure sensor 129, intake air pressure sensor 56, a mass air flow (MAF) sensor 57, and TIP sensor 59. Other sensors, such as additional pressure, temperature, air/fuel ratio, and composition sensors, may be coupled to various locations in engine system 100. The actuators 81 may include, for example, throttle 20, shut-off element 4, shut-off element 3a, shut-off element 5a, wastegate actuator 92, and fuel injector 66. Controller 12 may receive input data from the various sensors, process the input data, and employ the various actuators to adjust engine operation based on the received signals and instructions stored on a memory of the controller. The controller may employ the actuators in response to the processed input data based on instruction or code programmed therein corresponding to one or more routines, such as example control routines described herein with regard to FIG. 3. As an example, shut-off element 4 may be actuated to a fully closed position and shut-off element 3a simultaneously actuated to a fully open conditions based on operating conditions, which may be one or more of engine speed, engine load, and a charge air flow rate of compressor 114.

Figure 2A:
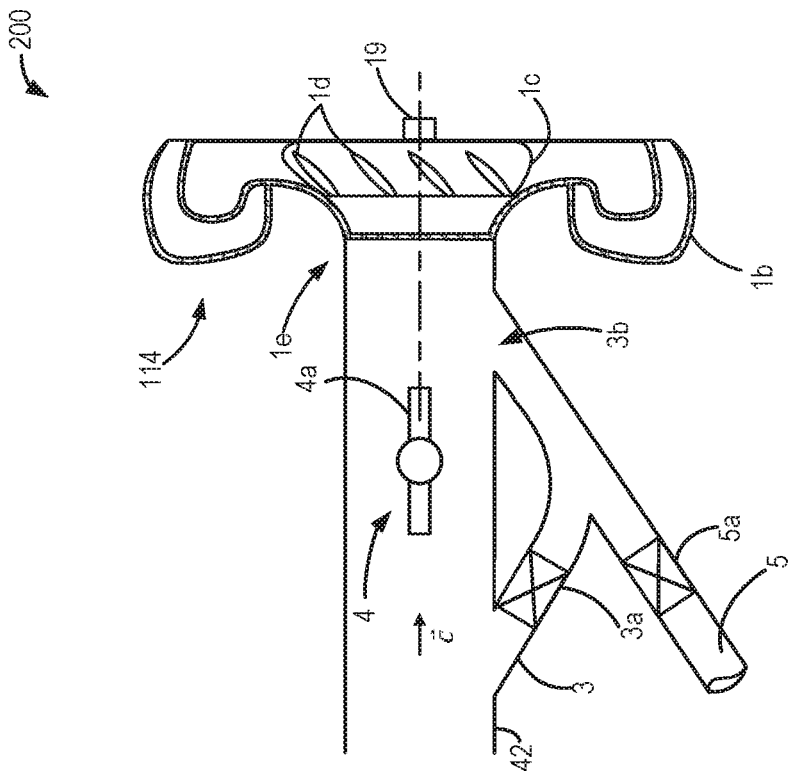
FIGS. 2A-2C schematically show a surge line system that may be used to adjust flow through a compressor arranged in an intake system.
Figure 2B:
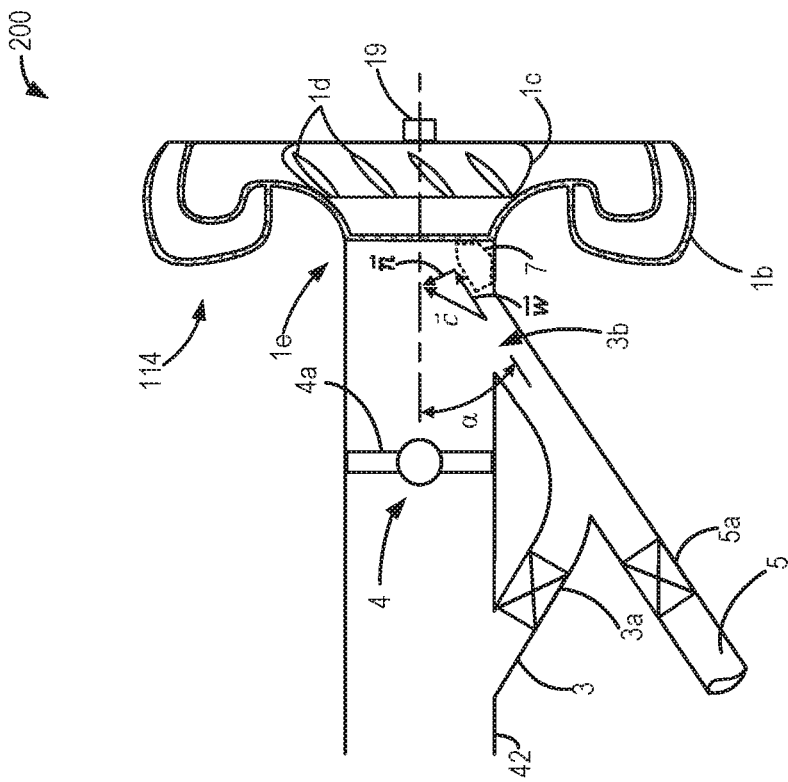
Figure 2C:
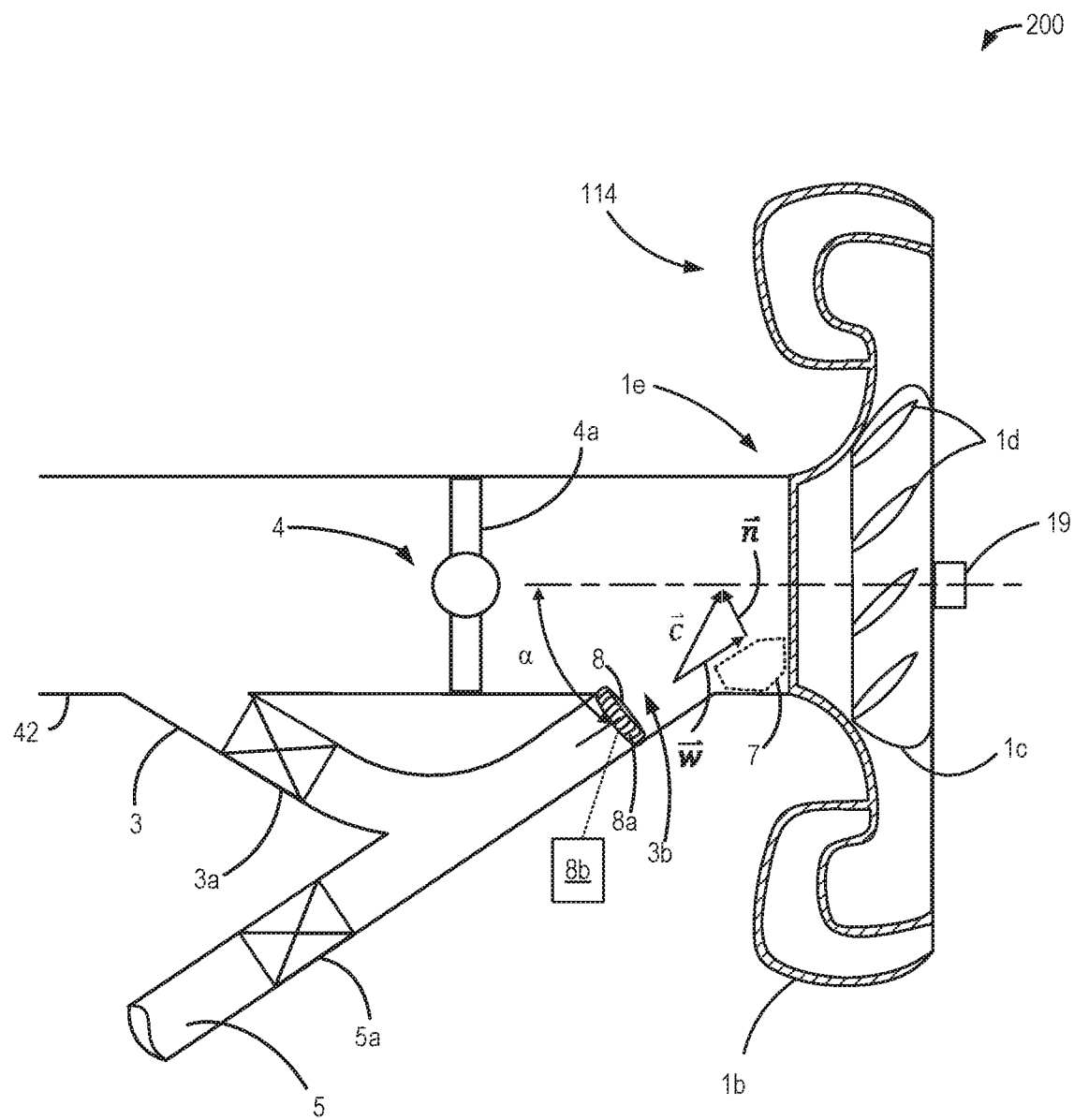

Next, FIGS. 2A-2C schematically show aspects of the compressor surge line system 200 shown in FIG. 1, partially in section. Like components of FIGS. 1 and 2A-2C are numbered the same and may not be reintroduced. Compressor 114, which may be arranged in intake system 2 of engine 10 as shown in FIG. 1, has an impeller 1c that is arranged on a rotatable shaft 19 in a compressor housing 1b and is equipped with impeller blades 1d. Compressor 114 has an inlet region 1e, which runs coaxially with respect to the shaft 19 of the compressor 114 and is configured such that the feed of charge air to the compressor 114 takes place axially. Shut-off element 4 is arranged upstream of the impeller 1c and is shown with pivotable flap 4a in the closed position in FIGS. 2A and 2C and the open position in FIG. 2B.

Upstream of the flap 4a, an absolute velocity c of the charge air flow when the flap 4a is open and in the presence of a low charge air flow rate is illustrated in FIG. 2B. Corresponding to the low flow rate of charge air and the relatively large flow cross section of the intake system 2, the absolute velocity c is small. Without a guide device, the charge air approaches the rotating impeller 1c axially, that is to say in the direction of the axis of rotation of the shaft 19 of the compressor 114, whereby, in the presence of low charge air flow rates, there is generally a poor approaching flow to the rotating impeller blades 1*d*, resulting in a poor torque characteristics at low engine speeds.

Therefore, at low engine speeds, pivotable flap 4*a* of the shut-off element 4 is closed, as shown in FIGS. 2A and 2C. As described above, when closed, pivotable flap 4*a* can be bypassed via bypass line 3, such as by opening the shut-off element 3*a*. In the presence of low charge air flow rates, the pivotable flap 4*a* is moved into the closed position, the shut-off element 3*a* is opened, and the rotating impeller 1*c* is supplied with charge air via the bypass line 3. In the projection shown in FIGS. 2A and 2C, which is perpendicular to the shaft 19 of the compressor 114, the bypass line 3 forms, in the mouth region 3*b*, an acute angle of inclination (or flow angle) α with respect to the shaft 19, as illustrated. As an example, α may be any non-zero, positive value angle that is less than 90°. As another example, α may be greater than or equal to 20° and less than or equal to 70°. In a further refinement, α may be greater than or equal to 30° and less than or equal to 60°.

The mouth region 3*b* may cause the charge air flow to accelerate as it emerges from the bypass line 3. That is, the absolute velocity c of the approaching charge air flow is increased by the mouth region 3*b*. Mouth region 3*b* may be arranged spaced apart from the shaft 19 perpendicularly with respect to the shaft, that is to say eccentrically. A charge air flow emerging from the bypass line 3, which is to be regarded as an elongation of the mouth region 3*b*, is in the present case oriented so as to be spaced apart, e.g., in a section perpendicular to the shaft, from the shaft 19 of the compressor 114.

Therefore, when the pivotable flap 4*a* of the shut-off element 4 is closed and the shut-off element 3*a* is opened, a geometry of the bypass line 3 imparts a velocity component to the charge air flow that enters the intake system 2 out of the mouth region 3*b* that is oriented transversely, tangentially, and/or radially with respect to the impeller 1*c* and with respect to the shaft 19 of the compressor 114. This velocity component rotates the absolute velocity c of the approaching charge air flow relative to the shaft 19 such that, in combination with a circumferential velocity u of the rotating impeller 1*c*, an increased utilizable relative velocity w of the approaching flow relative to the rotating impeller blades 1*d* is realized. For example, a velocity triangle of the charge air flow when the flap 4*a* is closed and in the presence of a low charge air flow rate is illustrated in FIG. 2A. The approaching flow to the rotating impeller 1*c* is thereby significantly increased.

Due to the flow angle α, which is defined by the geometry of the bypass line 3, a defined recirculation area 7 is formed. The recirculation area 7 reduces an effective area of the impeller 1*c*. For example, blades 1*d* of the impeller 1*c* that are immediately upstream of the recirculation area 7 may not interact with the charge air flow through the impeller. That is, mouth region 3*b* may prevent charge air from interacting with a portion of the impeller 1*d* in addition to accelerating the charge air flow as it emerges from the bypass line. For example, not the entire impeller is supplied with or blocked from receiving charge air. As another example, the mouth region 3*b*, particularly when having a slot-like or nozzle-like form, may cause an impingement of charge air on a limited segment of the impeller 1*c*. In the present case, not the entire impeller is impinged on by charge air. Rather, the charge air flow from the bypass line 3 is supplied in a targeted fashion to a limited sub-region of the impeller 1*c*. In this way, the low available charge air flow rate can be utilized more effectively.

For example, a ring-shaped segment of the rotating impeller 1*c* may be impinged on by charge air. For example, the ring-shaped segment may be spaced apart from the shaft 19 to the greatest possible extent, such that the ring-shaped segment includes a portion of the impeller 1*c* that includes an outer circumference of the impeller. The further the ring-shaped segment is spaced apart from the shaft 19 of the compressor, the more expedient it is with regard to the generation of an adequately high charge pressure. For example, impingement of charge air on a segment at an outer circumference of the rotating impeller 1*c* increases the charge air flow rate through the compressor 114 and increases the compressor efficiency. In this way, the low available charge air flow rate can be utilized more effectively. For example, a performance of compressor 114 may resemble that of a smaller compressor, with a higher compressor efficiency, and a surge limit of the compressor at low charge air flow rates may be extended.

Furthermore, due to the flow angle α and the recirculation area 7 influencing the approaching flow, complex guide devices that, for example, forcibly impart a swirl to the charge air flow (e.g., impart a velocity component transversely with respect to the shaft of the compressor or in the circumferential direction), may be omitted from the inlet 1*e*. By omitting the guide device, which are generally adjustable, costs may be reduced, and control strategies for the guide device also eliminated, reducing complexity of the charge air flow control. Additionally, by not including the guide device, an undesired flow resistance and reduction in the pressure in the charge air flow, in particular in the presence of high engine speeds or high charge air flow rates, is likewise eliminated.

In some example, as illustrated with respect to FIG. 2C, a guide device 8 may be arranged in the mouth region 3*b* of the bypass line 3. The guide device 8 may be an adjustable guide device that comprises guide vanes 8*a* that can be rotated by way of an adjustment device 8*b*. For example, the adjustment device 8*b* may be an actuator that adjusts a position of the guide vanes 8*a* in order to adjust the flow angle α based on the present charge air flow rate. By including the guide device 8, it is possible to targetedly influence the flow approaching the impeller blades 1*d*, in particular the nature and extent of the rotation of the absolute velocity c of the approaching charge air flow relative to the shaft 19 of the compressor.

Furthermore, the compressor surge line system 200 includes the compressed air line 5, which opens into the bypass line 3 between the mouth region 3*b* of the bypass line 3 and the shut-off element 3*a*. The compressed air line 5 is connected to a compressed air vessel (not illustrated in FIGS. 2A-2C). The line-specific shut-off element 5*a* is arranged in the compressed air line 5, wherein, by opening said shut-off element 5*a*, the compressed air line 5 is opened up, and air is additionally introduced into the intake system 2 from the compressed air vessel. The air additionally introduced via the compressed air line 5 serves for accelerating the compressor impeller 1*c*. The additional air, which is directed in the form of an air jet onto the impeller 1*c* of the compressor 114, is distinguished by a high level of kinetic energy and is suitable for introducing a high angular momentum into the impeller 1*c*. For example, via the air jet, the rotational speed of the impeller 1*c* can be rapidly increased proceeding from idle operation or in part-load operation of the internal combustion engine 10. The acceleration of the impeller in the event of an increased load demand is shortened, whereby the response behavior is noticeably faster. The rotational speed of the impeller can be increased relatively quickly to a required rotational speed, and the charge pressure can be increased with virtually no delay.

Together, the systems of FIGS. 1-2C provide for an internal combustion engine having a compressor, which may be in principle a supercharger that can be driven by means of an auxiliary drive or else may be the compressor of an exhaust gas turbocharger. The internal combustion engine according to the present disclosure is equipped, upstream of an impeller of the compressor, with a shut-off element arranged in the intake system that can be bypassed by way of a bypass line. These two design measures serve—in particular in the presence of low charge air flow rates—for influencing the approaching flow to the rotating impeller, and thereby increasing charging of the internal combustion engine.

Furthermore, the internal combustion engine according to the present disclosure has a compressed air line that opens into the bypass line between the mouth region of the bypass line and the further shut-off element of the bypass line. Said compressed air line is connected or connectable to a compressed air vessel, wherein a line-specific shut-off element is arranged in the compressed air line. Via the compressed air line, for the purposes of accelerating the compressor, air can be additionally introduced into the intake system, specifically, in interaction with the bypass line into which the compressed air line opens, in the form of a directed air flow in the form of an air jet onto the impeller of the compressor. The air jet generated in this way is distinguished by a high level of kinetic energy and, with suitable orientation or design of the bypass line relative to the impeller, is suitable for introducing a high angular momentum, with which the impeller can be brought to a higher rotational speed, that is to say accelerated. With such a structural measure, the rotational speed of the impeller can be easily increased proceeding from idle operation or in part-load operation of the internal combustion engine. Thereby, the boosted internal combustion engine exhibits faster response behavior in part-load operation, and the boosting behavior of which in the presence of low charge air flow rates is increased.

Embodiments of the boosted internal combustion engine are provided in which the bypass line forms, in the mouth region and in a projection perpendicular to the shaft of the at least one compressor, an acute angle of inclination α with respect to the shaft. Embodiments of the boosted internal combustion engine are provided in which a guide device is arranged in the mouth region of at least one bypass line. Here, embodiments of the boosted internal combustion engine are provided in which the guide device is an adjustable guide device that comprises guide vanes that can be rotated by way of an adjustment device. Then, the angle of inclination α can, within certain limits, be varied or adjusted in a manner dependent on the present charge air flow rate. By way of the adjustable guide device, it is possible to targetedly influence the flow approaching the impeller blades, in particular the nature and extent of the rotation of the absolute velocity c of the approaching charge air flow relative to the shaft of the compressor.

Embodiments of the boosted internal combustion engine are provided in which the mouth region is of nozzle-like form. If the mouth region has, similar to a nozzle, a constricted flow cross section, the charge air flow is accelerated as it emerges from the bypass line, that is to say the absolute velocity c of the approaching charge air flow is increased. This effect has proven to have an effect in particular in the presence of low charge air flow rates, when the shut-off element is closed and the bypass line is utilized for the impingement of charge air on the impeller.

Embodiments of the boosted internal combustion engine are provided in which the mouth region is of slot-like form. A mouth region of slot-like form is particularly suitable for causing an impingement of charge air on a limited segment of the impeller and/or for accelerating the charge air flow as it emerges from the bypass line.

Embodiments of the boosted internal combustion engine are provided in which the mouth region is arranged spaced apart from the shaft of the at least one compressor perpendicularly with respect to the shaft, that is to say eccentrically. A charge air flow emerging from the bypass line, which is to be regarded as an elongation of the mouth region, is in the present case oriented so as to be spaced apart—in a section perpendicular to the shaft—from the shaft of the compressor.

Embodiments of the boosted internal combustion engine are provided in which the mouth region causes an impingement of charge air on a limited segment of the impeller. In the present case, not the entire impeller is supplied with, or impinged on by, charge air. Rather, the charge air flow from the bypass line is supplied targetedly to a limited sub-region of the impeller. In this way, the low available charge air flow rate can be utilized in an efficient manner, that is to say more effectively. In particular, a ring-shaped segment of the rotating impeller may be impinged on by charge air. Embodiments of the boosted internal combustion engine are therefore also provided in which the mouth region, in a projection in the direction of the shaft of the compressor, causes an impingement of charge air on a ring-shaped segment of the impeller. In this context, embodiments of the boosted internal combustion engine are advantageous in which the ring-shaped segment is arranged so as to be spaced apart—such as to the greatest possible extent—from the shaft of the compressor. From a flow aspect, and therefore also with regard to the efficiency of the compressor, a segment at an outer circumference of the rotating impeller may be impinged on by charge air. The further the segment is spaced apart from the shaft of the compressor, the more expedient it is with regard to the generation of an adequately high charge pressure.

Embodiments of the boosted internal combustion engine are provided in which a throttle device is arranged in the intake system downstream of the compressor. It may be expedient for a throttle device to be provided in the intake system in order, in the context of the quantity regulation, to be able to adjust the load in wide ranges, in particular in the presence of very low charge air flow rates, or in order to be able to shut off the supply of air to the cylinders. In this context, embodiments of the boosted internal combustion engine are provided in which the throttle device is a throttle flap. Embodiments of the boosted internal combustion engine are provided in which a charge air cooler is arranged in the intake system downstream of the compressor, such as upstream of the throttle device.

Embodiments of the boosted internal combustion engine are provided in which the compressor is an axial compressor, in the case of which the exit flow runs substantially axially. In the context of the present disclosure, "substantially axially" means that a speed component in the axial direction is greater than a radial speed component.

Embodiments of the boosted internal combustion engine are provided in which the compressor has an inlet region that runs coaxially with respect to the shaft of the compressor and which is designed such that the flow of the charge air approaching the compressor runs substantially axially. The charge air then does not have to be diverted while flowing through the inlet region in order to be fed axially to the compressor. Since a diversion or directional change of the charge air flow is absent in the inlet region, pressure losses in the charge air flow as a consequence of flow diversion are avoided. The degree of efficiency and the charge pressure ratio can be increased.

Embodiments of the boosted internal combustion engine are provided in which the compressor is a radial compressor. This embodiment may enable dense packaging if the compressor is the compressor of an exhaust gas turbocharger. The compressor housing may be configured as a spiral or worm housing.

Embodiments of the boosted internal combustion engine are provided in which an exhaust gas turbocharger is provided, comprising a turbine arranged in the exhaust gas discharge system and a compressor arranged in the intake system, the turbine and the compressor being arranged on the same rotatable shaft.

In further embodiments, at least two exhaust gas turbochargers are provided, such as for multi-stage turbocharging. The engine downsizing effect is further increased by way of the multi-stage turbocharging. Furthermore, the response behavior of an internal combustion engine boosted in this way is considerably faster in relation to a similar internal combustion engine with single-stage turbocharging because the relatively small high-pressure stage is less inert and the rotor of a smaller-dimensioned exhaust gas turbocharger can be accelerated more rapidly.

As has already been described at the outset, an internal combustion engine that is boosted by means of exhaust gas turbocharging suffers from a torque drop as soon as the engine rotational speed is reduced and the exhaust gas mass flow decreases. The torque characteristic of an internal combustion engine which is boosted by means of exhaust gas turbocharging can be increased by way of an additionally provided mechanical supercharger. Therefore, the compressor according to the present disclosure may be a compressor of the exhaust gas turbocharger or a compressor of the mechanical supercharger.

Embodiments of the boosted internal combustion engine may include an exhaust gas recirculation arrangement that comprises a line that opens into the intake system downstream of the compressor. To adhere to future limit values for nitrogen oxide emissions, use may be made of exhaust gas recirculation, that is to say a recirculation of exhaust gases from the outlet side to the inlet side, wherein the nitrogen oxide emissions can be lowered considerably with increasing exhaust gas recirculation rate. Here, embodiments are provided in which a cooler is provided in the line to the exhaust gas recirculation arrangement, in which cooler lowers the temperature in the hot exhaust gas flow and thus increases the density of the exhaust gases. The temperature of the cylinder fresh charge that results upon the mixing of the fresh air with the recirculated exhaust gases is reduced in this way, as a result of which said cooler also contributes to increased charging of the combustion chamber with charge air. Furthermore, embodiments are provided in which a shut-off element is provided in the line for exhaust gas recirculation. Said shut-off element serves for the control of the exhaust gas recirculation rate.

Figure 3:
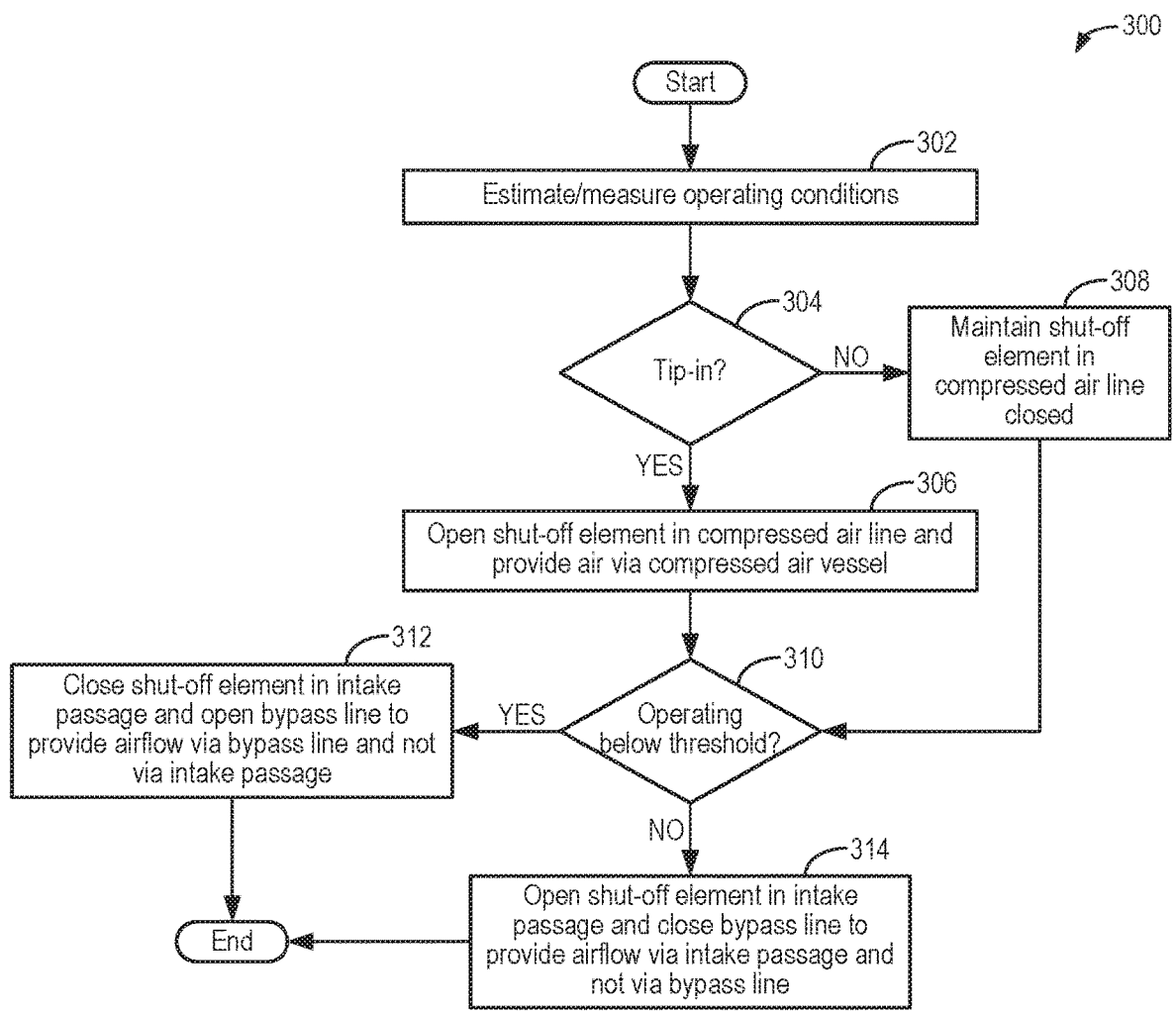
FIG. 3 is a flow chart of an example method for operating the compressor surge line system.

Next, FIG. 3 shows an example method 300 for controlling operation of a surge line system of a turbocharger compressor, such as compressor surge line system 200 of compressor 114 shown in FIGS. 1-2C. Instructions for carrying out method 300 and the rest of the methods included herein may be executed by a controller (e.g., controller 12 of FIG. 1) based on instructions stored on a memory of the controller and in conjunction with signals received from sensors of the engine system, such as the sensors described above with reference to FIG. 1. The controller may employ engine actuators of the engine system, such as a plurality of shut-off elements within the surge line system, to adjust engine operation according to the methods described below.

Method 300 begins at 302 and includes estimating/measuring operating conditions. Operating conditions may include engine speed, engine load, torque demand (e.g., as inferred from a position of an accelerator pedal), engine temperature (such as inferred from an engine coolant temperature measured by an engine coolant temperature sensor), mass air flow (e.g., as measured by a MAF sensor, such as MAF sensor 57 of FIG. 1), intake manifold pressure (e.g., as measured by a MAP sensor, such as MAP sensor 124 of FIG. 1), a pressure differential across the compressor (e.g., a ratio of an outlet pressure of the compressor and an inlet pressure of the compressor), a charge air flow rate through the compressor, a speed of the compressor, a requested amount of boost, etc. The operating conditions may be measured or inferred based on available data.

At 304, method 300 includes determining if a tip-in event is present. For example, it may be determined that a tip-in event is present if the torque demand has increased by more than a threshold amount and/or if the accelerator pedal has been depressed by more than a threshold amount from an un-depressed condition. As another example, the tip-in event may be confirmed responsive to an abrupt increase of the load demand. If the tip-in event is confirmed, method 300 proceeds to 306 and includes opening a shut-off element positioned in a compressed air line and providing air via a compressed air vessel. For example, the compressed air line shut-off element (e.g., shut-off element 5*a* of FIGS. 1-2C) may be actuated to a fully open position so that airflow is enabled through the compressed air line (e.g., compressed air line 5 of FIGS. 1-2C). As shown in FIG. 1, the compressed air line may couple the compressed air vessel (e.g., compressed air vessel 6 of FIG. 1) to an inlet of an impeller of the compressor. With the compressed air line shut-off element fully open, the compressed air vessel may supply compressed air directly onto the impeller as an air jet, the compressed air having a high level of kinetic energy that imparts a high angular momentum into the impeller to quickly accelerate the impeller and reduce turbo-lag. The compressed air may be provided for a pre-determined time duration while a turbine of the turbocharger spins up. In another example, the compressed air may be provided until the turbine reaches a pre-determined threshold speed, the threshold speed corresponding to a non-zero turbine speed that is capable of providing the higher requested amount of boost corresponding to the increased torque demand. After the pre-determined time duration elapses or the turbine reaches the threshold speed, the compressed air shut-off element may be fully closed so that additional air is no longer provided by the compressed air vessel.

If a tip-in event is not present at 304, method 300 proceeds to 308 and includes maintaining the shut-off element in the compressed air line closed (e.g., fully closed). As such, additional compressed air will not be provided to accelerate the impeller. For example, the speed of the turbine is sufficient to operate the compressor to provide the desired amount of boost.

At 310, method 300 includes determining if the engine is operating below a threshold. In one example, the threshold is an engine speed threshold. The engine speed threshold may be a pre-determined, non-zero engine speed threshold below which the charge air flow rate through the compressor may approach surge conditions. For example, the charge air flow rate through the compressor generally increases with the engine speed. However, in a spark ignition engine, the charge air flow rate increases with increasing load even at a constant engine speed (e.g., quantity regulation), whereas in a diesel engine with quality regulation, the charge air flow rate is, as a first approximation, dependent merely on engine speed, because in the event of a load shift at constant engine speed, a composition of an air-fuel mixture (but not the mixture quantity) is varied, such as by adjusting a fuel injection amount. Therefore, in some examples, the engine speed alone may not fully represent the charge air flow rate.

In another example, the threshold is an engine load threshold. For example, in the case of quantity regulation, the charge air flow rate increases with increasing load, even in the case of a constant engine speed. Therefore, the threshold engine load may be a pre-determined, non-zero engine load threshold below which the charge air flow rate through the compressor may approach surge conditions. In still another example, the threshold may be a speed and load threshold. The speed and load threshold may be a pre-determined speed and load threshold stored in a map or look-up table in a memory of the controller.

For example, referring to FIG. 4, a map 400 of engine speed and load is shown. The horizontal axis represents engine speed, with engine speed values increasing along the horizontal axis from left to right, and the vertical axis represents engine load, with engine load values increasing up the vertical axis from bottom to top. Map 400 includes an operational boundary line 402. All of the possible engine speed and engine load operational points of the engine may be contained within the axes and operational boundary line 402. Map 400 also includes an engine speed and load threshold 404 that divides map 400 into two areas: a first area 406, which is below, or to the left of, the engine speed and load threshold 404; and a second area 408, which is above, or to the right of, the engine speed and load threshold 404. When the engine is operating at an engine speed and engine load point that falls within the first area 406, the engine may be operating with lower charge air flow rates. Conversely, when the engine is operating at an engine speed and engine load point that falls within the second area 408, the engine may be with higher charge air flow rates.

Because the relationships discussed above regarding the charge air flow rate and the load or engine speed apply depending upon conditions, consideration may be given primarily to the charge air flow rate and not directly to the engine speed and/or load. Therefore, additionally or alternatively, at 310, method 300 may include determining if the compressor charge air flow rate is less than a threshold rate. The threshold rate may be a pre-determined non-zero rate threshold that is stored in a map or look-up table in a memory of the controller.

For example, referencing FIG. 5, a compressor map 500 is shown. The horizontal axis represents the compressor charge air flow rate (e.g., mass flow rate), with values increasing along the horizontal axis from left to right, and the vertical axis represents the pressure ratio across the compressor, with values increasing from bottom to top. Compressor map 500 shows a plurality of compressor speed lines 502. A surge limit 506a denotes a lower limit charge air flow rate for compressor operation while a choke limit 504 defines an upper limit charge air flow rate. Dashed line 508 represents the threshold charge air flow rate. Operating near the surge limit 506a may result in reduced compressor efficiency. Furthermore, operating at charge air flow rates below the threshold rate 508 may result in compressor surge and even lower efficiency. Therefore, systems and methods that move the surge limit to the left, such as indicated by dashed line 506b, can increase the compressor operating efficiency of a given operating point and extend the flow range of the compressor.

Returning to FIG. 3, if the engine is operating below the threshold (which may be a speed threshold, a load threshold, or a speed and load threshold, such as threshold 404 shown in FIG. 4), or if the compressor is operating with a charge air flow rate that this less than the threshold rate (e.g., threshold 508 shown in FIG. 5), method 300 proceeds to 312 and includes closing a shut-off element in an intake passage to the compressor (e.g., shut-off element 4 of FIGS. 1-2C) and opening a bypass line to provide airflow via the bypass line and not via the intake passage. As shown in FIGS. 1-2C, the shut-off element may include a pivotable flap (e.g., pivotable flap 4a), and closing the shut-off element may include actuating the pivotable flap to a fully closed position such that airflow to the impeller inlet directly from the intake passage is blocked by the pivotable flap. Opening the bypass line may include fully opening a shut-off element in the bypass line (e.g., shut-off element 3a disposed in bypass line 3 of FIGS. 1-2C) such that air is routed from the intake passage upstream of the fully closed pivotable flap to the bypass line and from the bypass line to the impeller inlet (e.g., downstream of the fully closed pivotable flap) via a mouth region of the bypass line (e.g., mouth region 3b of FIGS. 1-2C). As described with respect to FIG. 2A, the bypass line and the mouth region have a smaller diameter than the intake passage, which increases a velocity of the charge air flow relative to the velocity of the charge air flow through the intake passage. Furthermore, a geometry of the bypass line and the mouth region imparts a transverse, tangential, or radial velocity component to the charge air flow with respect to a central axis of rotation of the impeller and creates a recirculation area (e.g., recirculation area 7 shown in FIGS. 2A and 2C), which reduces an effective area of the impeller. Further still, the geometry of the bypass line and the mouth region may result in impingement of the charge air on select portion of the impeller.

Additionally, in some examples, providing airflow via the bypass line may optionally include adjusting a position of guide vanes of a guide device (e.g., guide device 8 shown in FIG. 2C). For example, the controller may input the charge air flow rate into a look-up table, algorithm, or map and output a desired guide vane position for the input charge air flow rate. The guide vanes may then be adjusted via an actuator (e.g., adjustment device 8b shown in FIG. 2C). Overall, providing airflow to the compressor via the open bypass passage and not via the closed intake passage extends the surge limit of the compressor at low charge air flow rates, such as by shifting the surge limit from surge limit 506a to surge limit 506b shown in FIG. 5 to increase a width of the compressor map. As such, stable compressor operation is enabled at low charge air flow rates. Following 312, method 300 ends.

Returning to 310, if the engine is not operating below the threshold, or if the compressor is not operating below the threshold charge air flow rate, method 300 proceeds to 314 and includes opening (or maintaining open) the shut-off element in the intake passage and closing (or maintaining closed) the bypass line to provide airflow via the intake passage and not via the bypass line. For example, opening the shut-off element in the intake passage may include actuating the pivotable flap to a fully open position such that air flows directly from the intake passage to the compressor inlet. Closing the bypass line may include fully closing the shut-off element within the bypass line such that the shut-off element blocks airflow through the bypass passage. Providing airflow via the intake passage and not via the bypass passage increases an effective area of the impeller and enables higher compressor mass flow rates and pressure ratios, thereby enabling peak engine power at the higher engine speeds and loads. Following 314, method 300 ends.

Note that while the examples herein describe transitioning the various shut-off elements (e.g., shut-off element 4, shut-off element 3*a*, and shut-off element 5*a* shown in FIGS. 1-2C) between a fully open and a fully closed position, in other examples, one or more of the shut-off elements may be continuously variable between the fully open and fully closed positions. In such examples, the controller may further determine a degree of opening when opening of a shut-off element is commanded. For example, the controller may input operating conditions, such as one or more of a requested boost pressure, a charge air flow rate, MAP, MAF, engine speed, and engine load, into a look-up table, algorithm, or map and output the degree of opening. The controller may then send a command signal to actuate the corresponding shut-off element to a position corresponding to the determined degree of opening.

In this way, by controlling flow through a compressor surge line system responsive to engine and/or compressor operating conditions, a flow range of the compressor may be increased while compressor efficiency is also increased. By providing charge air flow to the compressor via a bypass passage during low charge air flow conditions, a surge margin of the compressor is extended, enabling high low end torque for more aggressive engine downsizing. Furthermore, by including a compressed air line that selectively supplies compressed air from a compressed air vessel, faster turbocharger acceleration is enabled, resulting in a faster delivery of high pressure charge air.

Next, FIG. 6 shows an example timeline 600 for controlling operation of a compressor surge line system (e.g., compressor surge line system 200 shown in FIGS. 1-2C) based on engine load, such as according to the method of FIG. 3. Note that in other examples, the compressor surge line system may be additionally or alternatively adjusted based on engine speed and/or a charge air flow rate. The compressor surge line system may be coupled to an intake system of an engine, upstream of a turbocharger compressor, such as shown in FIG. 1. Engine load is shown in plot 602, compressor mass flow rate (e.g., charge air flow rate) is shown in plot 604, a position of an intake passage shut-off element is shown in plot 606, a position of a bypass passage shut-off element is shown in plot 608, and a position of a compressed air shut-off element is shown in plot 610. For all of the above, the horizontal axis represents time, with time increasing along the horizontal axis from left to right. The vertical axis represents each labeled parameter. For plots 602 and 604, the value of the labeled parameter increases from bottom to top. For plots 606, 608, and 610, the vertical axis represents whether the corresponding parameter is open (e.g., fully open) or closed (e.g., fully closed), as labeled. Furthermore, dashed line 603 represents a threshold engine load, below which surge mitigation via the compressor surge line system is enabled.

Prior to time t1, the engine is operating with a relatively high engine load (plot 602), which is greater than the threshold engine load (dashed line 603), and the compressor mass flow rate (plot 604) is relatively high. With the engine load greater than the threshold engine load, the compressor is not at risk of surge due to low charge air flow rates. Therefore, the intake passage shut-off element (e.g., shut-off element 4 shown in FIGS. 1-2C) is kept in the fully open position (plot 606) and the bypass passage shut-off element (e.g., shut-off element 3*a* shown in FIGS. 1-2C) is kept in the fully closed position (plot 608). As such, airflow (which may comprise a mixture of fresh intake air and recirculated exhaust gas) may be provided to an inlet of an impeller of the compressor via the intake passage. Furthermore, a tip-in event is not present, and so the compressed air line shut-off element (e.g., shut-off element 5*a* shown in FIGS. 1-2C) is also kept in the fully closed position (plot 610). As a result, compressed air is not provided to accelerate the compressor, and the compressor may instead be spun by a turbine of the turbocharger via a shaft.

Shortly before time t1, the engine load (plot 602) decreases, such as due to a tip-out of an accelerator pedal by a vehicle operator. At time t1, the engine load (plot 602) decreases below the threshold engine load (dashed line 603). In response, the intake passage shut-off element is actuated to the closed position (plot 606) while the bypass passage shut-off element is simultaneously actuated to the open position (plot 608), thereby providing all of the airflow to the impeller via the bypass passage. As a result of an extended surge margin and an increased relative velocity of the airflow through the bypass passage, the compressor mass flow rate (plot 604) is higher than if airflow were not provided via the bypass passage (dashed segment 604*b*).

Shortly before time t2, the compressor mass flow rate (plot 604) begins to increase. At time t2, the engine load (plot 602) increases above the threshold engine load (dashed line 603). In response, the intake passage shut-off element is actuated to the open position (plot 606), thereby enabling higher air flow rates through the impeller, and the bypass passage shut-off element is actuated to the closed position (plot 608), thereby preventing intake airflow through the bypass passage. Furthermore, due to the abrupt increase in the load demand, a tip-in event is confirmed. In response, the compressed air line shut-off element is actuated to the fully open position (plot 610), and compressed air from a compressed air vessel is provided via the compressed air line to quickly accelerate the compressor. As a result, the compressor mass flow rate (plot 604) increases at a faster rate than if the compressed air were not used (indicated by dashed segment 604*b*). As such, the turbocharger exhibits a faster boost response to transient conditions, making operation more similar to that of a supercharger without the additional mechanical or electrical load demand.

After a threshold duration, at time t3, the compressed air line shut-off element is actuated to the fully closed position (plot 610), and compressed air is no longer provided via the compressed air line. For example, after the threshold duration, the turbocharger turbine may be capable of providing sufficient boost pressure. Thus, after time t3, airflow is provided to the impeller via the intake passage only.

In this way, by providing charge air flow to the compressor via the bypass passage during low charge air flow conditions, a surge margin of the compressor is extended, increasing a flow range of the compressor and increasing compressor efficiency. Furthermore, by supplying compressed air via the compressed air line during a tip-in, turbo-lag is reduced to quickly meet an increased load demand from a vehicle operator. Overall, high low end torque is enabled, thereby enabling aggressive engine downsizing and increased fuel economy with simple control and a compact system design. The technical effect of providing charge air to an inlet of an impeller via a bypass line is that a compressor map width is increased at low flow rates and impeller acceleration is expedited during transient conditions.

In one example, a system for an internal combustion engine comprises: an intake system for supplying charge air; a compressor arranged in the intake system, the compressor including an impeller arranged on a rotatable shaft in a compressor housing; a first shut-off element arranged in the intake system upstream of the impeller; a bypass line that branches off from the intake system upstream of the first shut-off element and opens into the intake system again between the first shut-off element and the impeller, forming a mouth region, and in which a second shut-off element is provided; a compressed air line that opens into the bypass line between the mouth region and the second shut-off element, the compressed air line coupled to a vessel that stores compressed air; and a third shut-off element arranged in the compressed air line. In the preceding example, additionally or optionally, the bypass line forms, in the mouth region and in a projection perpendicular to the shaft, an acute angle of inclination $\alpha$ with respect to the shaft. In any or all of the preceding examples, additionally or optionally, a guide device is arranged in the mouth region of the bypass line. In any or all of the preceding examples, additionally or optionally, the guide device is an adjustable guide device that comprises guide vanes rotatable by an adjustment device. In any or all of the preceding examples, additionally or optionally, the mouth region is of nozzle-like form. In any or all of the preceding examples, additionally or optionally, the mouth region is of slot-like form. In any or all of the preceding examples, additionally or optionally, the mouth region is arranged spaced apart from the shaft perpendicularly with respect to the shaft. In any or all of the preceding examples, additionally or optionally, the mouth region causes an impingement of charge air on a limited segment of the impeller. In any or all of the preceding examples, additionally or optionally, the limited segment is ring-shaped. In any or all of the preceding examples, additionally or optionally, the ring-shaped segment is arranged spaced apart from the shaft of the compressor.

In another example, a method comprises: adjusting a first shut-off element position arranged in an intake passage upstream of an impeller of a compressor and a second shut-off element position arranged in a bypass passage coupling the intake passage upstream of the first shut-off element to the intake passage downstream of the first shut-off element based on one or more of engine speed, engine load, and charge air flow rate. In the preceding example, additionally or optionally, adjusting the first shut-off element position and the second shut-off element position based on one or more of the engine speed, the engine load, and the charge air flow rate includes: actuating the first shut-off element into a fully closed position and the second shut-off element into an open position responsive to the charge air flow rate falling below a threshold charge air flow rate; and actuating the first shut-off element into an open position and the second shut-off element into a fully closed position responsive to the charge air flow rate reaching or exceeding the threshold charge air flow rate. In any or all of the preceding examples, additionally or optionally, adjusting the first shut-off element position and the second shut-off element position based on one or more of the engine speed, the engine load, and the charge air flow rate includes: actuating the first shut-off element into a fully closed position and the second shut-off element into an open position responsive to the engine speed falling below a threshold engine speed; and actuating the first shut-off element into an open position and the second shut-off element into a fully closed position responsive to the engine speed reaching or exceeding the threshold engine speed. In any or all of the preceding examples, additionally or optionally, adjusting the first shut-off element position and the second shut-off element position based on one or more of the engine speed, the engine load, and the charge air flow rate includes: actuating the first shut-off element into a fully closed position and the second shut-off element into an open position responsive to the engine load falling below a threshold engine load; and actuating the first shut-off element into an open position and the second shut-off element into a fully closed position responsive to the engine load reaching or exceeding the threshold engine load. In any or all of the preceding examples, the method additionally or optionally further comprises adjusting a position of a third shut-off element arranged in a compressed air line coupled to the bypass line downstream of the second shut-off element responsive to a tip-in event. In any or all of the preceding examples, additionally or optionally, adjusting the position of the third shut-off element responsive to the tip-in event includes: actuating the third shut-off element from a fully closed position to an open position; and actuating the third shut-off element to the fully closed position after maintaining the third shut-off element in the open position for a duration.

As another example, a system comprises: an engine coupled to an intake passage for receiving charge air and an exhaust passage for discharging exhaust gases; a compressor positioned in the intake passage, the compressor including an impeller arranged on a shaft; a first shut-off element disposed in the intake passage upstream of the impeller; a bypass line coupled to the intake passage at a first junction upstream of the first shut-off element and a second junction downstream of the first shut-off element; a second shut-off element disposed in the bypass line; a compressed air line that couples a compressed air vessel to the bypass line downstream of the second shut-off element; a third shut-off element disposed in the compressed air line; and a controller storing executable instructions in non-transitory memory that, when executed, cause the controller to: actuate the first shut-off element from an open position to a fully closed position and actuate the second shut-off element from a fully closed to an open position responsive to a low charge air flow condition; and actuate the third shut-off element to an open position responsive to a tip-in event. In the preceding example, the system additionally or optionally further comprises a throttle and a charge air cooler, each of the throttle and the charge air cooler arranged in the intake passage downstream of the compressor. In any or all of the preceding examples, additionally or optionally, the compressor is one of a radial compressor and an axial compressor. In any or all of the preceding examples, the system additionally or optionally further comprises a turbine arranged in the exhaust passage, and wherein the turbine is coupled to the compressor via the shaft.

In another representation, an engine system comprises: an intake passage for supplying charge air; a compressor arranged in the intake passage, the compressor including an impeller arranged on a rotatable shaft; a first shut-off element arranged in the intake passage upstream of the impeller; a bypass line coupled to the intake passage at a first junction upstream of the first shut-off element and at a section junction between the first shut-off element and the impeller, forming a mouth region at the second junction; a second shut-off element disposed in the bypass line; a compressed air line that opens into the bypass line between the mouth region and the second shut-off element, the compressed air line coupled to a vessel that stores compressed air; and a third shut-off element arranged in the compressed air line. In the preceding example, the system additionally or optionally further comprises a controller storing executable instructions in non-transitory memory that, when executed, cause the controller to: adjust the first shut-off element and the second shut-off element based on one or more of engine speed, engine load, and charge air flow rate. In any or all of the preceding examples, the instructions that cause the controller to adjust the first shut-off element and the second shut-off element based on one or more of engine speed, engine load, and charge air flow rate include further instructions that, when executed, cause the controller to: adjust the first shut-off element from an open position to a fully closed position and adjust the second shut-off element from a fully closed position to an open position in response to one or more of the engine speed decreasing below a threshold engine speed, the engine load decreasing below a threshold engine load, and the charge air flow rate decreasing below a threshold charge air flow rate. In any or all of the preceding examples, the instructions that cause the controller to adjust the first shut-off element and the second shut-off element based on one or more of engine speed, engine load, and charge air flow rate include further instructions that, when executed, cause the controller to: adjust the first shut-off element from the fully closed position to the open position and adjust the second shut-off element from the an open position to the fully closed position in response to one or more of the engine speed reaching or exceeding the threshold engine speed, the engine load reaching or exceeding the threshold engine load, and the charge air flow rate reaching or exceeding the threshold charge air flow rate. In any or all of the preceding examples, the controller additionally or optionally stores further instructions that, when executed, cause the controller to: adjust the third shut-off element responsive to a tip-in event includes.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An intake system for an internal combustion engine, comprising:
   a compressor arranged in the intake system, the compressor including an impeller arranged on a rotatable shaft in a compressor housing;
   a first shut-off element arranged in the intake system upstream of the impeller;
   a bypass line that branches off from the intake system upstream of the first shut-off element and opens into the intake system again between the first shut-off element and the impeller, forming a mouth region, and in which a second shut-off element is provided;
   a compressed air line that opens into the bypass line between the mouth region and the second shut-off element, the compressed air line coupled to a vessel that stores compressed air; and
   a third shut-off element arranged in the compressed air line.

2. The intake system of claim 1, wherein the bypass line forms an acute angle of inclination a with respect to a shaft.

3. The intake system of claim 1, wherein a guide device is arranged in the mouth region of the bypass line.

4. The intake system of claim 3, wherein the guide device is an adjustable guide device that comprises guide vanes rotatable by an adjustment device.

5. The intake system of claim 1, wherein the mouth region causes an impingement of charge air on a limited segment of the impeller.

6. A method for controlling an intake system of an internal combustion engine, comprising:
   via a controller, adjusting a first shut-off element position arranged in an intake passage upstream of an impeller of a compressor and a second shut-off element position arranged in a bypass passage coupling the intake passage upstream of the first shut-off element to the intake passage downstream of the first shut-off element based on one or more of engine speed, engine load, and charge air flow rate; and
   adjusting a position of a third shut-off element arranged in a compressed air line coupled to the bypass line downstream of the second shut-off element position responsive to a tip-in event via the controller.

7. The method of claim 6, wherein adjusting the first shut-off element position and the second shut-off element position based on one or more of the engine speed, the engine load, and the charge air flow rate includes:
actuating the first shut-off element into a fully closed position and the second shut-off element into an open position responsive to the charge air flow rate falling below a threshold charge air flow rate via the controller; and
actuating the first shut-off element into an open position and the second shut-off element into a fully closed position responsive to the charge air flow rate reaching or exceeding the threshold charge air flow rate via the controller.

8. The method of claim 6, wherein adjusting the first shut-off element position and the second shut-off element position based on one or more of the engine speed, the engine load, and the charge air flow rate includes:
actuating the first shut-off element into a fully closed position and the second shut-off element into an open position responsive to the engine speed falling below a threshold engine speed via the controller; and
actuating the first shut-off element into an open position and the second shut-off element into a fully closed position responsive to the engine speed reaching or exceeding the threshold engine speed via the controller.

9. The method of claim 6; wherein adjusting the first shut-off element position and the second shut-off element position based on one or more of the engine speed, the engine load, and the charge air flow rate includes;
actuating the first shut-off element into a fully closed position and the second shut-off element into an open position responsive to the engine load falling below a threshold engine load via the controller; and
actuating the first shut-off element into an open position and the second shut-off element into a fully closed position responsive to the engine load reaching or exceeding the threshold engine bad via the controller.

10. The method of claim 6, wherein adjusting the position of the third shut-off element responsive to the tip-in event includes:
actuating the third shut-off element from a fully closed position to an open position via the controller; and
actuating the third shut-off element to the fully closed position after maintaining the third shut-off element in the open position for a duration via the controller.

11. An engine system, comprising:
an engine coupled to an intake passage for receiving charge air and an exhaust passage for discharging exhaust gases;
a compressor positioned in the intake passage, the compressor including an impeller arranged on a shaft;
a first shut-off element disposed in the intake passage upstream of the impeller;
a bypass line coupled to the intake passage at a first junction upstream of the first shut-off element and a second junction downstream of the first shut-off element;
a second shut-off element disposed in the bypass line;
a compressed air line that couples a compressed air vessel to the bypass line downstream of the second shut-off element;
a third shut-off element disposed in the compressed air line; and
a controller storing executable instructions in non-transitory memory that, when executed, cause the controller to:
actuate the first shut-off element from an open position to a fully closed position and actuate the second shut-off element from a fully closed position to an open position responsive to a low charge air flow condition determined via the controller; and actuate the third shut-off element to an open position responsive to a tip-in event determined via the controller.

12. The engine system of claim 11, further comprising a throttle and a charge air cooler, each of the throttle and the charge air cooler arranged in the intake passage downstream of the compressor.

13. The engine system of claim 11, wherein the compressor is one of a radial compressor and an axial compressor.

14. The engine system of claim 11, further comprising a turbine arranged in the exhaust passage, and wherein the turbine is coupled to the compressor via the shaft.

* * * * *